(12) United States Patent
Davis

(10) Patent No.: US 9,279,983 B1
(45) Date of Patent: Mar. 8, 2016

(54) IMAGE CROPPING

(71) Applicant: Benjamin Davis, San Francisco, CA (US)

(72) Inventor: Benjamin Davis, San Francisco, CA (US)

(73) Assignee: Google Inc., Mountain View, CA (US)

( * ) Notice: Subject to any disclaimer, the term of this patent is extended or adjusted under 35 U.S.C. 154(b) by 339 days.

(21) Appl. No.: 13/664,151

(22) Filed: Oct. 30, 2012

(51) Int. Cl.
*G09G 5/00* (2006.01)
*G02B 27/01* (2006.01)

(52) U.S. Cl.
CPC ........ *G02B 27/01* (2013.01); *G02B 2027/0138* (2013.01); *G02B 2027/0187* (2013.01)

(58) Field of Classification Search
USPC .............................. 345/8, 620–628; 348/208.3
See application file for complete search history.

(56) References Cited

U.S. PATENT DOCUMENTS

| | | | |
|---|---|---|---|
| 6,628,711 B1 * | 9/2003 | Mathew et al. | 375/240.12 |
| 7,561,793 B2 | 7/2009 | Brost | |
| 7,627,174 B1 | 12/2009 | Adams et al. | |
| 7,705,884 B2 * | 4/2010 | Pinto et al. | 348/208.99 |
| 7,755,667 B2 * | 7/2010 | Rabbani et al. | 348/208.6 |
| 8,102,429 B2 * | 1/2012 | Molgaard | 348/208.3 |
| 8,134,603 B2 * | 3/2012 | Auberger et al. | 348/208.3 |
| 2008/0165280 A1 * | 7/2008 | Deever et al. | 348/497 |
| 2009/0290809 A1 | 11/2009 | Yamada | |
| 2010/0127329 A1 * | 5/2010 | Park et al. | 257/351 |
| 2010/0289913 A1 * | 11/2010 | Fujiwara | 348/222.1 |
| 2011/0013049 A1 * | 1/2011 | Thorn | 348/240.3 |
| 2011/0149094 A1 * | 6/2011 | Chen et al. | 348/208.3 |
| 2011/0169928 A1 | 7/2011 | Gassel et al. | |
| 2011/0249122 A1 * | 10/2011 | Tricoukes et al. | 348/158 |
| 2012/0001943 A1 * | 1/2012 | Ishidera | 345/659 |
| 2012/0127329 A1 * | 5/2012 | Voss et al. | 348/208.4 |
| 2012/0274750 A1 * | 11/2012 | Strong | 348/52 |
| 2012/0281106 A1 * | 11/2012 | Foster et al. | 348/222.1 |
| 2013/0016122 A1 * | 1/2013 | Bhatt et al. | 345/620 |
| 2013/0021373 A1 * | 1/2013 | Vaught et al. | 345/633 |
| 2013/0076921 A1 * | 3/2013 | Owen et al. | 348/208.4 |
| 2013/0083202 A1 * | 4/2013 | Batur | 348/169 |
| 2013/0208134 A1 * | 8/2013 | Hamalainen | 348/208.99 |
| 2014/0028847 A1 * | 1/2014 | Wang | 348/148 |

* cited by examiner

*Primary Examiner* — Ryan R Yang
(74) *Attorney, Agent, or Firm* — McDonnell Boehnen Hulbert & Berghoff LLP

(57) ABSTRACT

Methods and systems are provided for cropping a digital image based on movement data. A wearable computing device may receive image data. The wearable computing device may comprise a head-mountable display (HMD), and the HMD may comprise a viewing frame. The image data may be displayed within the viewing frame. The wearable computing device may receive movement information indicative of at least one movement of the wearable computing device. The at least one movement of the wearable computing device may comprises at least one of a pan of the wearable computing device or a tilt of the wearable computing device. In response to receiving the movement information, the wearable computing device may perform a cropping action on the image data so as to generate a cropped image. The cropped image may represent a reduced portion of the image data.

28 Claims, 12 Drawing Sheets

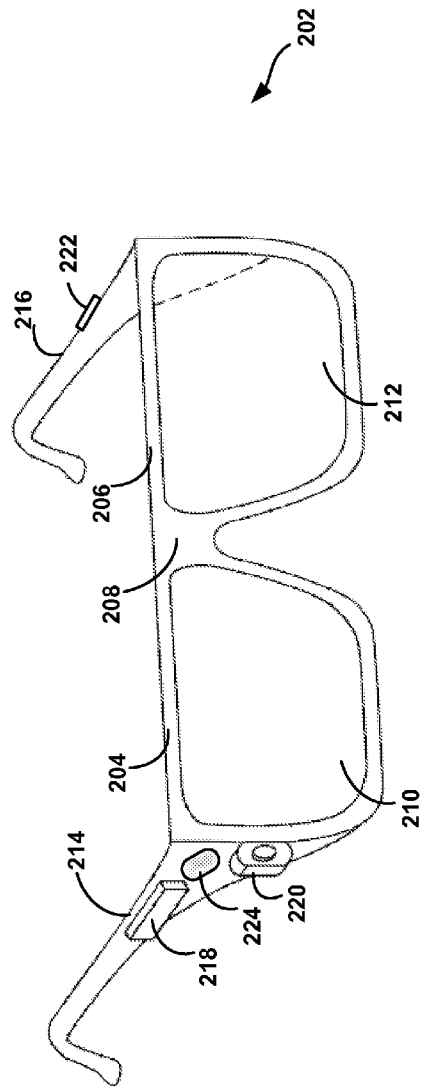
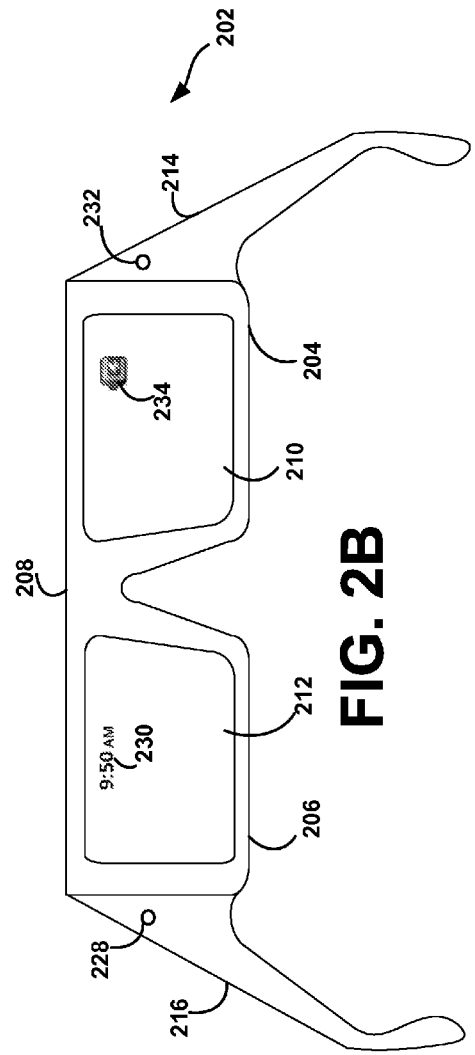

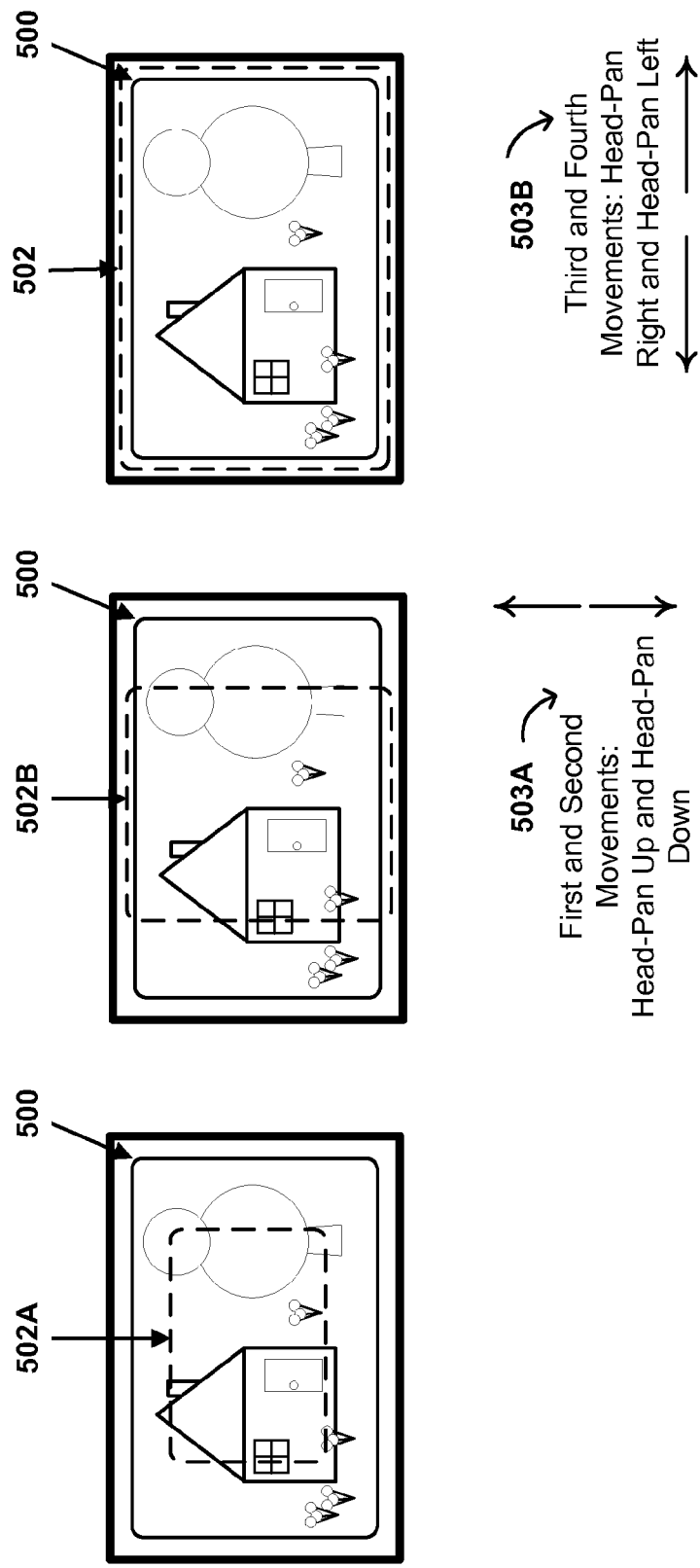

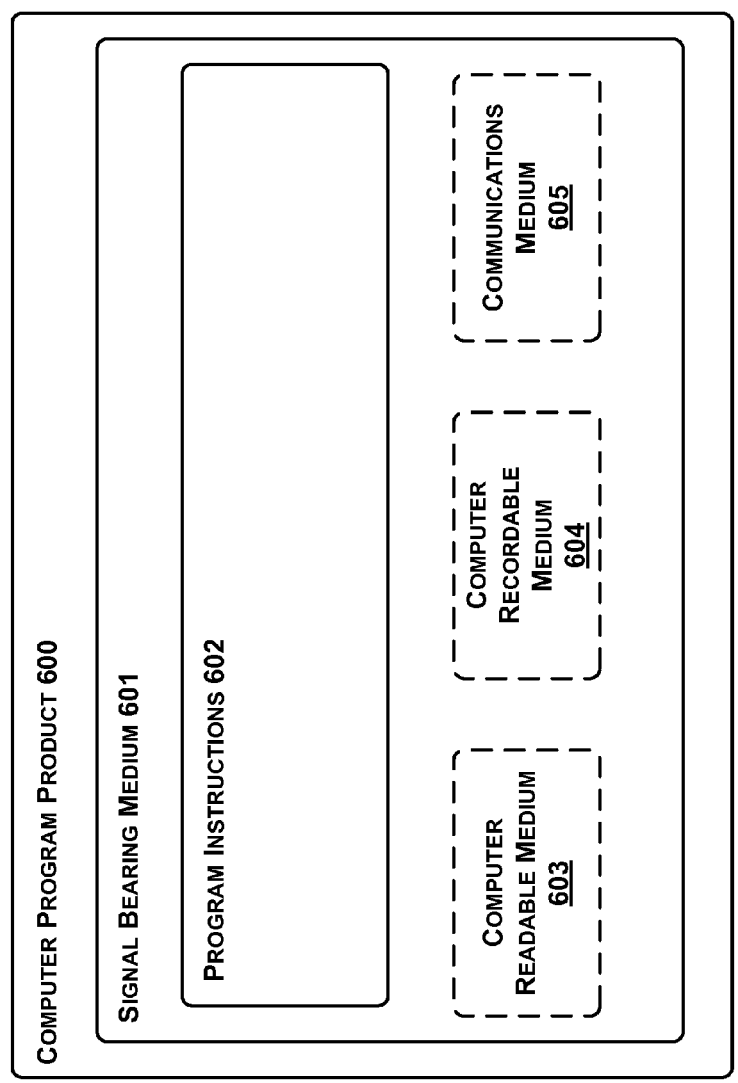

IMAGE CROPPING

BACKGROUND

Unless otherwise indicated herein, the materials described in this section are not prior art to the claims in this application and are not admitted to be prior art by inclusion in this section.

The use of digital imagery is becoming more and more prevalent. One of the many benefits of using a digital image is the ease with which the digital image may be used. For example, a digital image may be immediately viewed, saved, or shared with others via a webpage. Another benefit of a digital image is the ease of which the digital image may be processed. Present day image processing software allows extensive modifications to be made to a digital image to, for example, improve clarity and/or color balance of the digital image. The image processing may be performed using image processing software on a personal computer or at a photo kiosk, for example.

Another common manipulation of a digital image is the cropping of the digital image. Cropping a digital image changes the original digital frame size to any reduced and desired frame size. As a result of the change in digital frame size, a new image is generated consisting only of the reduced and desired frame size. Cropping is generally performed to improve the composition of the image by enlarging the subject of the image and/or discarding any undesired or distracting backgrounds or background elements.

SUMMARY

This disclosure may disclose, inter alia, methods and systems for cropping a digital image based on movement data.

In one embodiment a method is disclosed. The method includes receiving, at a wearable computing device, image data. The wearable computing device comprises a head-mountable display (HMD). The HMD comprises a viewing frame configured to display the image data. The method also includes receiving movement information that is indicative of at least one movement of the wearable computing device. The at least one movement of the wearable computing device comprises at least one of a pan of the wearable computing device or a tilt of the wearable computing device. The method additionally includes in response to receiving the movement information, performing a cropping action on the image data so as to generate a cropped image. The cropped image represents a reduced portion of the image data.

In a second embodiment, a wearable computing device is disclosed. The wearable computing device includes a head mountable display (HMD) and the HMD comprises a viewing frame. The wearable computing device also includes a non-transitory computer-readable medium, at least one processor, and program instructions stored on the non-transitory computer-readable medium and executable by the at least one processor to perform functions. The functions include receiving image data. The image data is displayed within the viewing frame. The functions also include receiving movement information that is indicative of at least one movement of the wearable computing device. The at least one movement of the wearable computing device comprises at least one of a pan of the wearable computing device or a tilt of the wearable computing device. The functions additionally include in response to receiving the movement information, performing a cropping action on the image data so as to generate a cropped image. The cropped image represents a reduced portion of the image data.

In a third embodiment, a non transitory computer-readable medium having stored therein program instructions executable by a wearable computing device to cause the wearable computing device to perform functions is disclosed. The functions include receiving image data. The functions also include displaying the image data on a head mountable display (HMD) within a viewing frame. The functions include receiving movement information that is indicative of at least one movement of the wearable computing device. The at least one movement of the wearable computing device comprises at least one of a pan of the wearable computing device or a tilt of the wearable computing device. The functions additionally include in response to receiving the movement information, performing a cropping action on the image data so as to generate a cropped image, wherein the cropped image represents a reduced portion of the image data.

These as well as other aspects, advantages, and alternatives, will become apparent to those of ordinary skill in the art by reading the following detailed description, with reference where appropriate to the accompanying figures.

BRIEF DESCRIPTION OF THE DRAWINGS

FIG. 2A illustrates a wearable computing device that may be used in conjunction with the systems and methods described herein, in accordance with an example embodiment.

FIG. 2B illustrates an alternate view of the wearable computing device illustrated in FIG. 2A.

FIGS. 5A-5D illustrate image data that is processed in accordance with the example method of FIG. 4C.

FIG. 6 is a schematic illustrating a conceptual partial view of an example computer program product that includes a computer program for executing a computer process on a computing device, in accordance with an example embodiment.

DETAILED DESCRIPTION

The following detailed description describes various features and functions of the disclosed systems and methods with reference to the accompanying figures. In the figures, similar symbols typically identify similar components, unless context dictates otherwise. The illustrative system and method embodiments described herein are not meant to be limiting. It will be readily understood that certain aspects of the disclosed systems and methods can be arranged and combined in a wide variety of different configurations, all of which are contemplated herein.

Furthermore, the particular arrangements shown in the Figures should not be viewed as limiting. It should be understood that other embodiments may include more or less of each element shown in a given Figure. Further, some of the illustrated elements may be combined or omitted. Yet further, an example embodiment may include elements that are not illustrated in the Figures.

I. Overview

Example applications for digital-image editing allow for a digital image to be cropped or portions of the digital image to be removed, and generally use input devices such as a mouse or track-pad, for example, to provide inputs. Within further examples disclosed herein, a computing device, a head mounted display ("HMD"), or a smartphone is provided that is configured to execute a photo-editing application using screen and/or head tilt sensors to provide for a fast and natural technique to crop an image.

As an example, an HMD may be configured to capture image data representing a car. Upon receiving the image data, the HMD may display a full-frame image representing the car on the HMD, and may receive instructions to enter a cropping mode via a device input (e.g., touching a sensor button or using voice controls). Once in cropping mode, the HMD may receive inputs indicating a pan or tilt movement of the HMD (e.g., due to a user moving head up and down or side to side). The HMD may be configured to crop the photo based on the received movement inputs, and may display the image moving out of the frame corresponding to a direction or movement of the HMD. Any part of the image that exits the frame may be considered to be "cropped," or removed from the image.

II. Example Computing Devices and Systems

Figure 1:
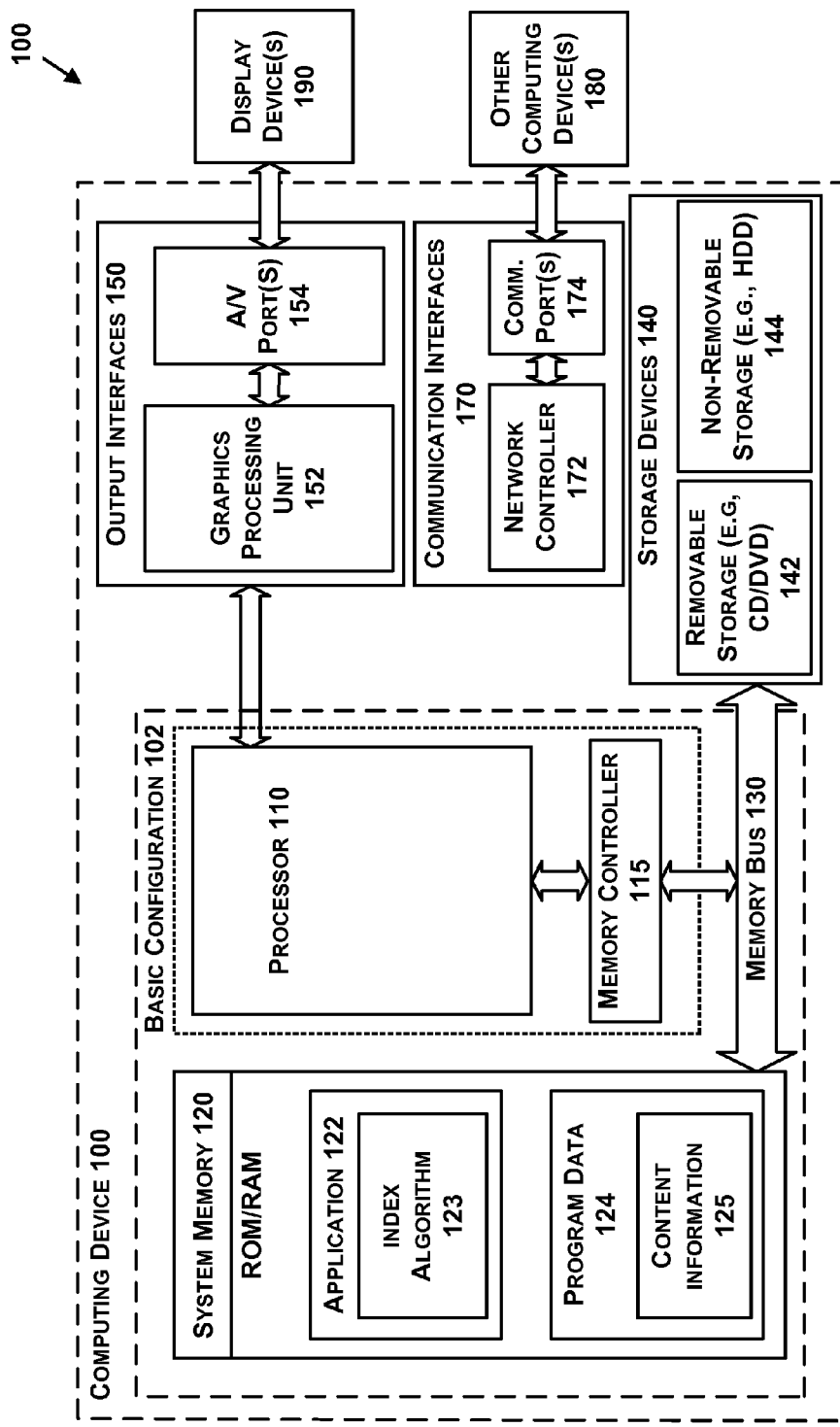
FIG. 1 is a functional block diagram of a computing device that may be used in conjunction with the systems and methods described herein, in accordance with an example embodiment.

FIG. 1 is a functional block diagram illustrating an example computing device that may be used to carry out the methods and functions described herein. The computing device may be or include a personal computer, mobile device, cellular phone, smartphone, touch-sensitive wristwatch, tablet computer, video game system, or global positioning system, and may be implemented to provide a system for implementing the methods and functions described herein. In a basic configuration 102, computing device 100 may include one or more processors 110 and system memory 120. A memory bus 130 can be used for communicating between the processor 110 and the system memory 120. Depending on the desired configuration, processor 110 can be of any type including but not limited to a microprocessor (µP), a microcontroller (µC), a digital signal processor (DSP), or any combination thereof. A memory controller 115 can also be used with the processor 110, or in some implementations, the memory controller 115 can be an internal part of the processor 110.

Depending on the desired configuration, the system memory 120 can be of any type including but not limited to volatile memory (such as RAM), non-volatile memory (such as ROM, flash memory, etc.) or any combination thereof. System memory 120 may include one or more applications 122, and program data 124. Application 122 may include an index algorithm 123 that is arranged to provide inputs to the electronic circuits, in accordance with the present disclosure. Program data 124 may include content information 125 that could be directed to any number of types of data. In some example embodiments, application 122 can be arranged to operate with program data 124 on an operating system.

Computing device 100 can have additional features or functionality, and additional interfaces to facilitate communications between the basic configuration 102 and any devices and interfaces. For example, data storage devices 140 can be provided including removable storage devices 142, non-removable storage devices 144, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Computer storage media can include volatile and nonvolatile, non-transitory, removable and non-removable media implemented in any method or technology for storage of information, such as computer readable instructions, data structures, program modules, or other data.

System memory 120 and storage devices 140 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media can be part of device 100.

Computing device 100 can also include output interfaces 150 that may include a graphics processing unit 152, which can be configured to communicate to various external devices such as display devices 190 or speakers via one or more A/V ports or a communication interface 170. The communication interface 170 may include a network controller 172, which can be arranged to facilitate communications with one or more other computing devices 180 over a network communication via one or more communication ports 174. The communication connection is one example of a communication media. Communication media may be embodied by computer readable instructions, data structures, program modules, or other data in a modulated data signal, such as a carrier wave or other transport mechanism, and includes any information delivery media. A modulated data signal can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared (IR) and other wireless media.

Computing device 100 may also include a sensor and a camera (not shown). The sensor may include one or more of a gyroscope or an accelerometer, for example. Other sensing devices may be included within the sensor on in addition to it, and other functions may be performed by the sensor. The camera may comprise a video camera, and may be configured to capture images at various resolutions or at different frame rates.

Computing device 100 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 100 can also be implemented as a personal computer including both laptop computer and non-laptop computer configurations.

FIG. 2A illustrates a wearable computing device according to an exemplary embodiment. The wearable computing device illustrated in FIG. 2A may be used to carry out the methods and functions described herein, and in one example, may include components as described in FIG. 1. In FIG. 2A, the wearable computing system takes the form of a head-mounted display (HMD) 202 (which may also be referred to as a head-mounted device). It should be understood, however, that exemplary systems and devices may take the form of or be implemented within or in association with other types of devices, without departing from the scope of the disclosure. As illustrated in FIG. 2A, the head-mounted device 202 comprises frame elements including lens-frames 204, 206 and a center frame support 208, lens elements 210, 212, and extending side-arms 214, 216. The center frame support 208 and the extending side-arms 214, 216 are configured to secure the head-mounted device 202 to the face of a user via a nose and ears of a user, respectively.

Each of the frame elements 204, 206, and 208 and the extending side-arms 214, 216 may be formed of a solid structure of plastic and/or metal, or may be formed of a hollow structure of similar material so as to allow wiring and component interconnects to be internally routed through the head-mounted device 202. Other materials may be possible as well.

One or more of each of the lens elements 210, 212 may be formed of any material that can suitably display a projected image or graphic. Each of the lens elements 210, 212 may also be sufficiently transparent to allow a user to see through the lens element. Combining these two features of the lens elements may facilitate an augmented reality or heads-up display where the projected image or graphic is superimposed over a real-world view as perceived by the user through the lens elements.

The extending side-arms 214, 216 may each be projections that extend away from the lens-frames 204, 206, respectively, and may be positioned behind ears of a user to secure the head-mounted device 202 to the user. The extending side-arms 214, 216 may further secure the head-mounted device 202 to the user by extending around a rear portion of the head of the user. Additionally or alternatively, for example, the HMD 202 may connect to or be affixed within a head-mounted helmet structure. Other possibilities exist as well.

The HMD 202 may also include a on-board computing system 218, a video camera 220, a sensor 222, and a finger-operable touch pad 224. The on-board computing system 218 is shown to be positioned on the extending side-arm 214 of the head-mounted device 202; however, the on-board computing system 218 may be provided on other parts of the head-mounted device 202 or may be positioned remote from the head-mounted device 202 (e.g., the on-board computing system 218 could be wire- or wirelessly-connected to the head-mounted device 202). The on-board computing system 218 may include a processor and memory, for example. The on-board computing system 218 may be configured to receive and analyze data from the video camera 220 and the finger-operable touch pad 224 (and possibly from other sensory devices, user interfaces, or both) and generate images for output by the lens elements 210 and 212.

The video camera 220 is shown positioned on the extending side-arm 214 of the head-mounted device 202; however, the video camera 220 may be provided on other parts of the head-mounted device 202. The video camera 220 may be configured to capture images at various resolutions or at different frame rates. Many video cameras with a small form-factor, such as those used in cell phones or webcams, for example, may be incorporated into an example of the HMD 202.

Further, although FIG. 2A illustrates one video camera 220, more video cameras may be used, and each may be configured to capture the same view, or to capture different views. For example, the video camera 220 may be forward facing to capture at least a portion of the real-world view perceived by the user. This forward facing image captured by the video camera 220 may then be used to generate an augmented reality where computer generated images appear to interact with the real-world view perceived by the user.

The sensor 222 is shown on the extending side-arm 216 of the head-mounted device 202; however, the sensor 222 may be positioned on other parts of the head-mounted device 202. The sensor 222 may include one or more of a gyroscope or an accelerometer, for example. Other sensing devices may be included within, or in addition to, the sensor 222 or other sensing functions may be performed by the sensor 222.

The finger-operable touch pad 224 is shown on the extending side-arm 214 of the head-mounted device 202. However, the finger-operable touch pad 224 may be positioned on other parts of the head-mounted device 202. Also, more than one finger-operable touch pad may be present on the head-mounted device 202. The finger-operable touch pad 224 may be used by a user to input commands. The finger-operable touch pad 224 may sense at least one of a position and a movement of a finger via capacitive sensing, resistance sensing, or a surface acoustic wave process, among other possibilities. The finger-operable touch pad 224 may be capable of sensing finger movement in a direction parallel or planar to the pad surface, in a direction normal to the pad surface, or both, and may also be capable of sensing a level of pressure applied to the pad surface. The finger-operable touch pad 224 may be formed of one or more translucent or transparent insulating layers and one or more translucent or transparent conducting layers. Edges of the finger-operable touch pad 224 may be formed to have a raised, indented, or roughened surface, so as to provide tactile feedback to a user when the finger of a user reaches the edge, or other area, of the finger-operable touch pad 224. If more than one finger-operable touch pad is present, each finger-operable touch pad may be operated independently, and may provide a different function.

FIG. 2B illustrates an alternate view of the wearable computing device illustrated in FIG. 2A. As shown in FIG. 2B, the lens elements 210, 212 may act as display elements. The head-mounted device 202 may include a first projector 228 coupled to an inside surface of the extending side-arm 216 and configured to project a display 230 onto an inside surface of the lens element 212. Additionally or alternatively, a second projector 232 may be coupled to an inside surface of the extending side-arm 214 and configured to project a display 234 onto an inside surface of the lens element 210.

The lens elements 210, 212 may act as a combiner in a light projection system and may include a coating that reflects the light projected onto them from the projectors 228, 232. In some embodiments, a reflective coating may not be used (e.g., when the projectors 228, 232 are scanning laser devices).

In alternative embodiments, other types of display elements may also be used. For example, the lens elements 210, 212 themselves may include: a transparent or semi-transparent matrix display, such as an electroluminescent display or a liquid crystal display, one or more waveguides for delivering an image to the eyes of the user, or other optical elements capable of delivering an in focus near-to-eye image to the user. A corresponding display driver may be disposed within the frame elements 204, 206 for driving such a matrix display. Alternatively or additionally, a laser or LED source and scanning system could be used to draw a raster display directly onto the retina of one or more eyes of the user. Other possibilities exist as well.

Figure 2C:
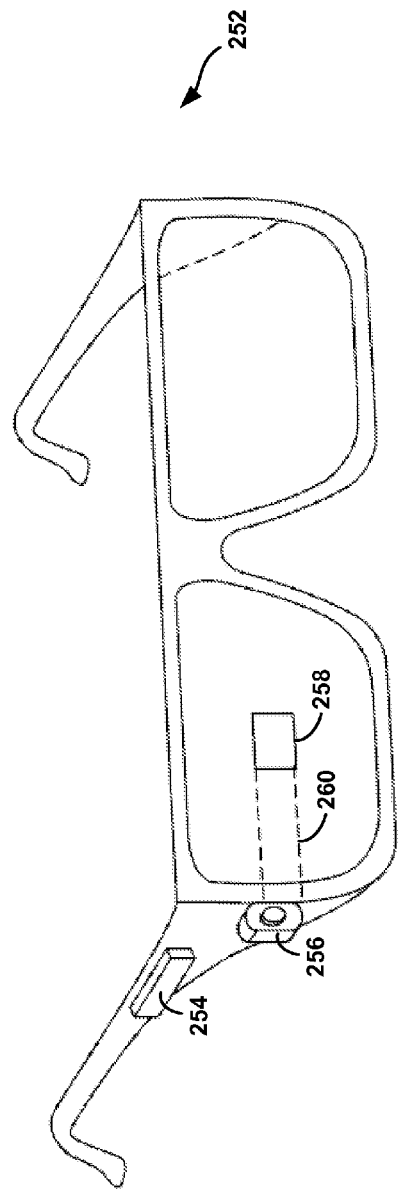
FIG. 2C illustrates another wearable computing device that may be used in conjunction with the systems and methods described herein, in accordance with an example embodiment.

FIG. 2C illustrates another wearable computing system according to an exemplary embodiment, which takes the form of an HMD 252. The HMD 252 may include frame elements and side-arms such as those described with respect to FIGS. 1A and 1B. The HMD 252 may additionally include an on-board computing system 254 and a video camera 256, such as those described with respect to FIGS. 2A and 2B. The video camera 256 is shown mounted on a frame of the HMD 252. However, the video camera 256 may be mounted at other positions as well.

As shown in FIG. 2C, the HMD 252 may include a single display 258 which may be coupled to the device. The display 258 may be formed on one of the lens elements of the HMD 252, such as a lens element described with respect to FIGS. 2A and 2B, and may be configured to overlay computer-generated graphics in the physical-world view of the user. The display 258 is shown to be provided in a center of a lens of the HMD 252, however, the display 258 may be provided in other positions. The display 258 is controllable via the computing system 254 that is coupled to the display 258 via an optical waveguide 260.

Figure 2D:
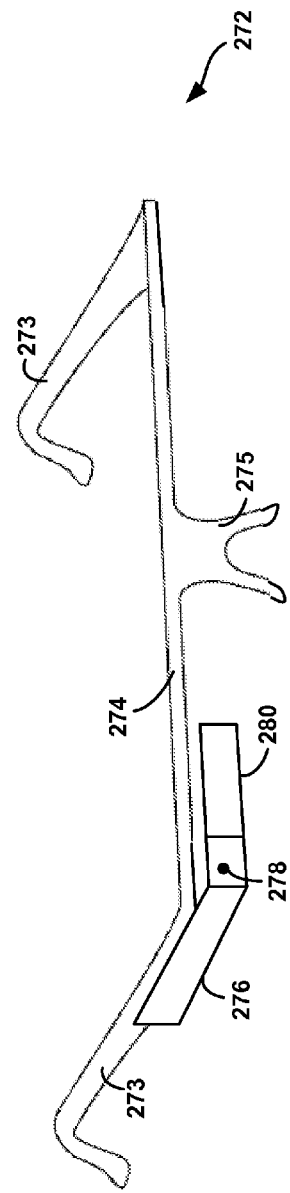
FIG. 2D illustrates another wearable computing device that may be used in conjunction with the systems and methods described herein, in accordance with an example embodiment.

FIG. 2D illustrates another wearable computing system according to an exemplary embodiment, which takes the form of an HMD 272. The HMD 272 may include side-arms 273, a center frame support 274, and a bridge portion with nose-piece 272. In the example shown in FIG. 2D, the center frame support 274 connects the side-arms 273. The HMD 272 does not include lens-frames containing lens elements. The HMD 272 may additionally include an on-board computing system 276 and a video camera 278, such as those described with respect to FIGS. 2A and 2B.

The HMD 272 may include a single lens element 280 that may be coupled to one of the side-arms 273 or the center frame support 274. The lens element 280 may include a display such as the display described with reference to FIGS. 2A and 2B, and may be configured to overlay computer-generated graphics upon the physical-world view of the user. In one example, the single lens element 280 may be coupled to the inner side (i.e., the side exposed to a portion of a head of a user when worn by the user) of the extending side-arm 273. The single lens element 280 may be positioned in front of or proximate to an eye of the user when the HMD 272 is worn by a user. For example, the single lens element 280 may be positioned below the center frame support 274, as shown in FIG. 2D.

Figure 3:
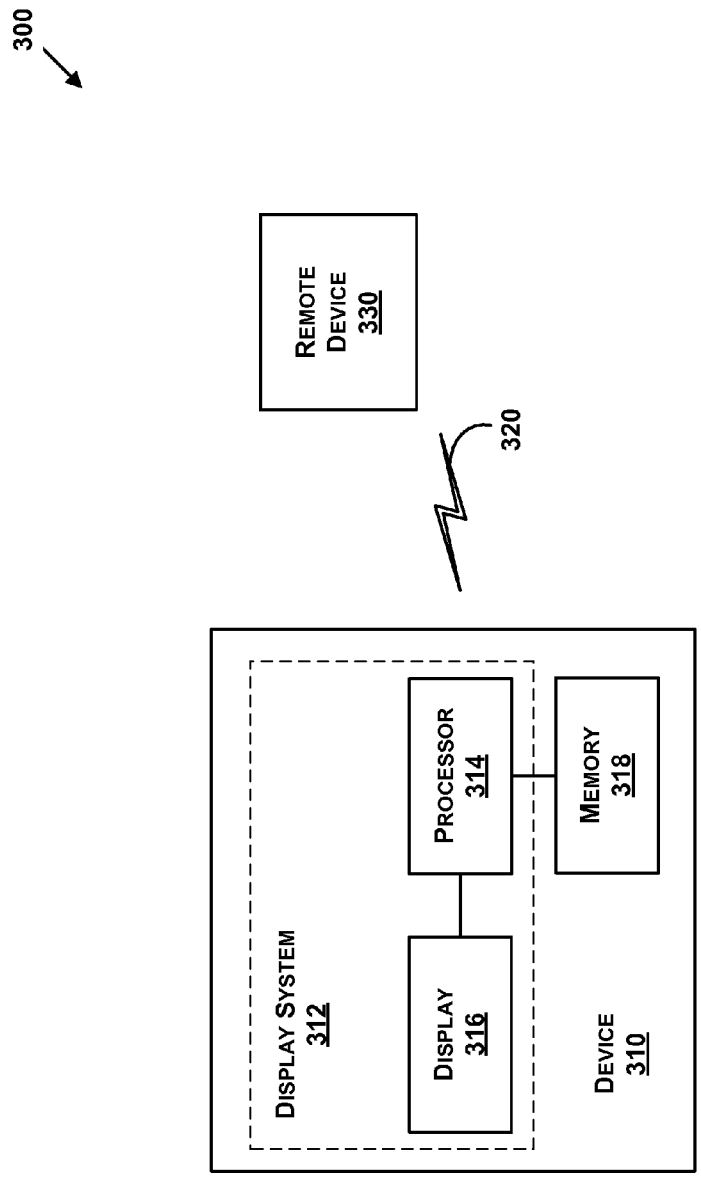
FIG. 3 illustrates a functional block diagram of an example computing device used in a computing system such as those depicted in FIGS. 2A-2D, in accordance with an example embodiment.

FIG. 3 illustrates a schematic drawing of a computing device according to an exemplary embodiment. In system 300, a device 310 communicates using a communication link 320 (e.g., a wired or wireless connection) to a remote device 330. The device 310 may be any type of device that can receive data and display information corresponding to or associated with the data. For example, the device 310 may be a heads-up display system, such as the head-mounted devices 202, 252, or 272 described with reference to FIGS. 2A-2D.

Thus, the device 310 may include a display system 312 comprising a processor 314 and a display 316. The display 316 may be, for example, an optical see-through display, an optical see-around display, or a video see-through display. The processor 314 may receive data from the remote device 330, and configure the data for display on the display 316. The processor 314 may be any type of processor, such as a micro-processor or a digital signal processor, for example.

The device 310 may further include on-board data storage, such as memory 318 coupled to the processor 314. The memory 318 may store software that can be accessed and executed by the processor 314, for example.

The remote device 330 may be any type of computing device or transmitter including a laptop computer, a mobile telephone, or tablet computing device, etc., that is configured to transmit data to the device 310. The remote device 330 and the device 310 may contain hardware to enable the communication link 320, such as processors, transmitters, receivers, antennas, etc.

In FIG. 3, the communication link 320 is illustrated as a wireless connection; however, wired connections may also be used. For example, the communication link 320 may be a wired serial bus such as a universal serial bus or a parallel bus. A wired connection may be a proprietary connection as well. The communication link 320 may also be a wireless connection using, e.g., Bluetooth® radio technology, communication protocols described in IEEE 802.11 (including any IEEE 802.11 revisions), Cellular technology (such as GSM, CDMA, UMTS, EV-DO, WiMAX, or LTE), or Zigbee® technology, among other possibilities. The remote device 330 may be accessible via the Internet and may include a computing cluster associated with a particular web service (e.g., social-networking, photo sharing, address book, etc.).

III. Example Methods

Figure 4A:
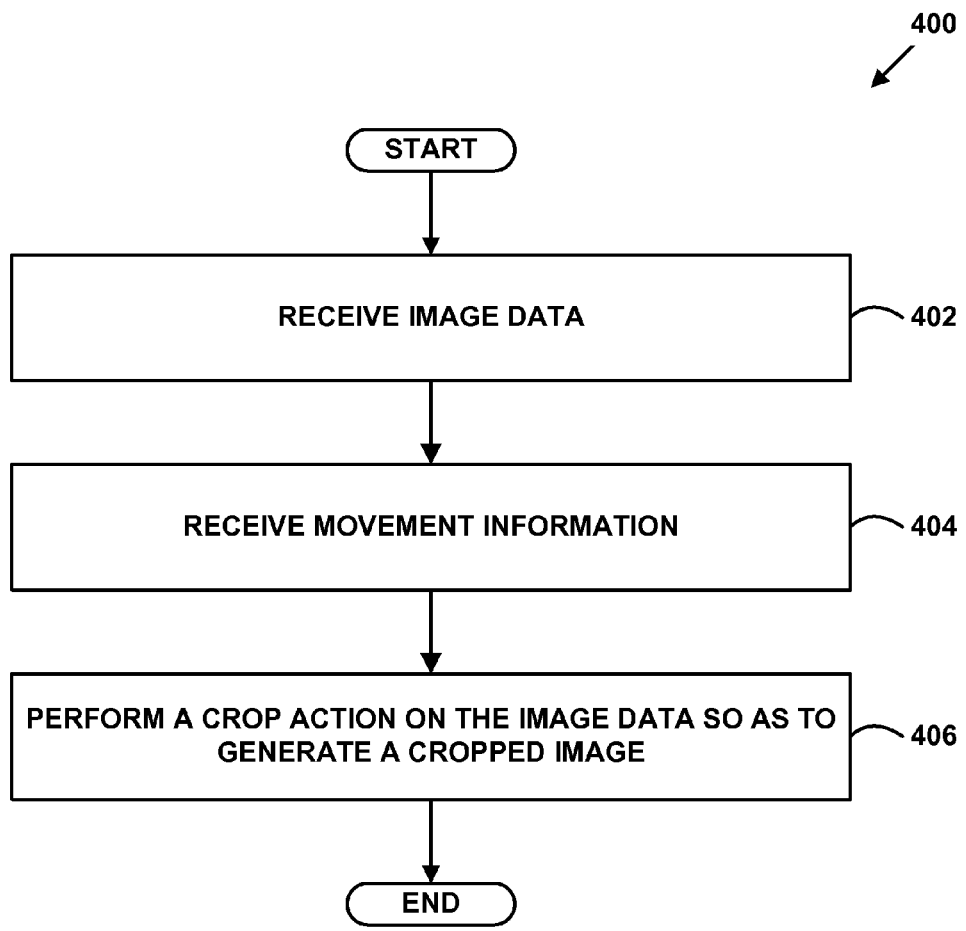
FIG. 4A is a block diagram of an example method for cropping a digital image based on movement data, in accordance with embodiments described herein.

FIG. 4A is a block diagram of an example method for cropping a digital image based on movement data. Method 400 shown in FIG. 4A presents an embodiment of a method that, for example, may be performed by a device discussed with reference to that of FIGS. 1 and 2A-2D. Method 400 may include one or more operations, functions, or actions as illustrated by one or more of blocks 402-406. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

In addition, for the method 400 and other processes and methods disclosed herein, the flowchart shows functionality and operation of one possible implementation of present embodiments. In this regard, each block may represent a module, a segment, or a portion of program code, which includes one or more instructions executable by a processor or computing device for implementing specific logical functions or steps in the process. The program code may be stored on any type of computer readable medium or memory, for example, such as a storage device including a disk or hard drive. The computer readable medium may include non-transitory computer readable media, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, or compact-disc read only memory (CD-ROM), for example. The computer readable media may also be any other volatile or non-volatile storage systems. The computer readable medium may be considered a computer readable storage medium, for example, or a tangible storage device.

In addition, for the method 400 and other processes and methods disclosed herein, each block in FIG. 4A may represent circuitry that is wired to perform the specific logical functions in the process.

Initially, at block 402, method 400 includes receive image data. The image data may be received by the computing device discussed with reference to FIG. 1, or the wearable-computing devices discussed with reference to FIGS. 2A-2D, for example. The image data can be, but need not be, data that was captured by a camera. In fact, the image data may be received from a number of sources such as input by a user, from a camera associated with the computing device, from a server, or database, for example.

The image data may comprise a digital photograph or a digital graphic. In other examples, the image data may be received in a compressed, processed format such as a Graphics Interchange Format (GIF), a Portable Network Graphics (PNG), a Tagged Image File Format (TIFF), or a Joint photographic Experts Group (JPEG), to name a few. In further examples, the image data may be received in an unprocessed raw format. In yet even further examples the image data may comprise a raster graphics image, or a bitmap. Other image data formats are possible. The image data may comprise any data format capable of organizing and storing a photographic image and/or graphic image as a digital file. Once the image data has been received by the computing device it may be displayed in the form of a digital image on a display of the computing device.

At block 404, method 400 includes receive movement information. The movement information may be indicative of a movement of the computing device that received the image data. The movement may include a pan or a tilt of the device, for example. In further examples, the movement may comprise a rotation of the computing device. Other movements are possible as well. The movements may be caused, for example, by a user physically panning or tilting the computing device. In one example, when the computing device takes the form of a head mounted computing device, the user may pan or tilt the computing device by panning or tiling his/her head. To pan the head mounted computing device the user may move his/her head left, right, up, or down. In other examples the user may lean left, right, forward or back thereby causing his/her head to move in the same direction the user leans. To tilt the head mounted computing device the user may, for example, tilt his/her head forward, back, left, or right.

The movement information may comprise information that is indicative of at least one direction and at least one magnitude that defines the at least one movement of the computing device. In instances where the movement includes a rotation, the movement information may further comprise information indicative of a rotation that defines the rotation of the computing device. The direction may comprise, for example, any direction of the four cardinal directions, such as east or west, or any combination thereof. In other examples, the directions may be defined as left, right, up, down, in, or out. The magnitude may include any measurement or quantification of the respective movement. Such measurements may include inches, centimeters, or degrees, to name a few.

The movement information may be obtained by a sensor coupled to the computing device. The sensor of the computing device may capture the movement information in real time while the computing device is being moved, for example. The sensor may be a sensor similar to the sensors discussed with reference to FIGS. 1 and 2A-2D, and may comprise an accelerometer, for example. In other examples, the movement information may be received from a server or network in the form of data representing the movements.

The direction, the magnitude, and the rotation may, for example, be represented by a string of characters that indicate or describe the respective movement. In one example, the characters may be arranged using the American Standard Code for Information Interchange (ASCII) scheme. Many character-encoding schemes are possible and may be used to describe the movements. In one particular example, one magnitude that defines a pan movement may be represented as "2 inches," and one magnitude that defines a rotation may be represented as "20 degrees." Combining representations of the movement information may also be used to represent the movement of the computing device. For instance, a particular movement may be represented as "20 inches left," which combines a magnitude and a direction. Other combinations of directions, rotations, and/or magnitudes that define the movement of the computing device are possible.

Figure 4B:
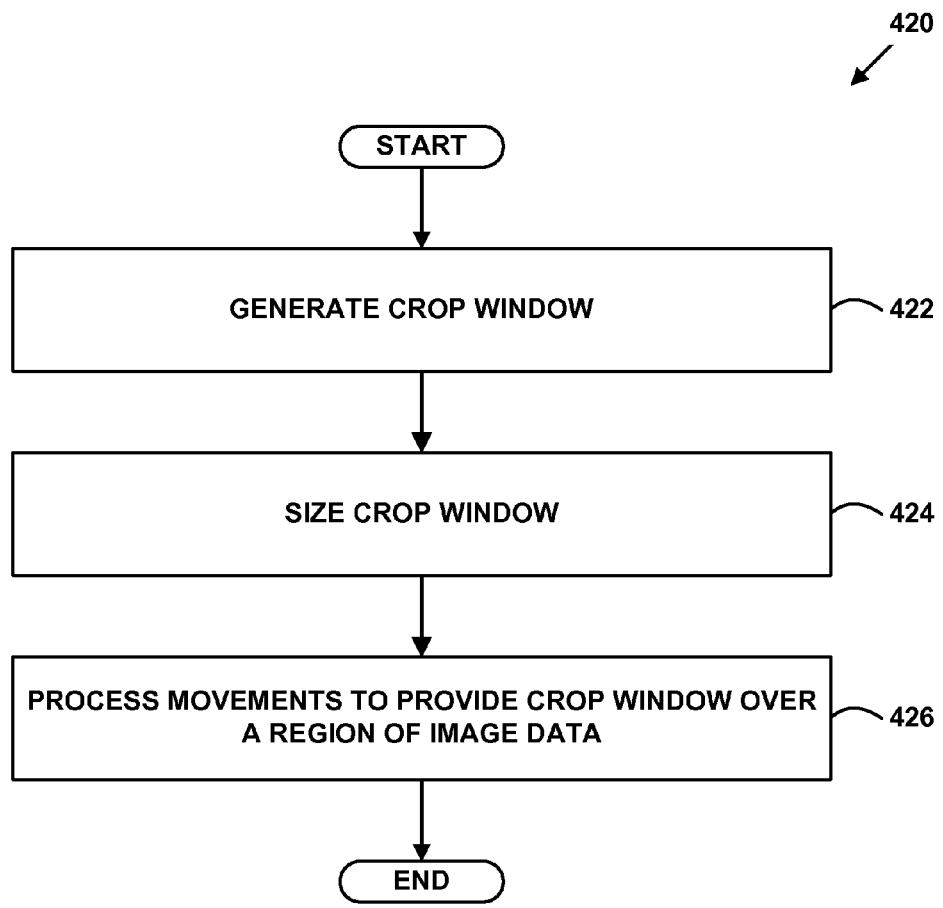
FIG. 4B is a block diagram of an example method for performing a cropping action, in accordance with embodiments described herein.

After the movement information has been obtained, at block 406, the method includes in response to receiving the movement information, perform a cropping action on the image data so as to generate a cropped image. FIG. 4B illustrates a block diagram representing the process by which the cropping action is performed and illustrates in further detail step 406 of FIG. 4A.

In FIG. 4B, at step 422, a crop window is generated. The computing device may generate a crop window 502 that is visible within a viewing frame 504 of the computing device, shown in FIG. 5A for example. With respect to FIGS. 1 and 2A-2D, the viewing frame may be frame elements 204, 206, for example. Once the crop window has been generated, at step 424 the crop window is sized. The crop window may have a size that is determined based on one or more of the direction and the magnitude that define the movement of the computing device, or in other words, be sized based on the series of movements of the computing device. For example, in FIG. 5A, the crop window 502 may be configured to be slightly larger than the digital image 500, but smaller than the viewing frame 504. In other examples, the crop window may be the size of the viewing frame, the size of the digital image 500, or other sizes according to predefined settings, for example.

Figure 5A:
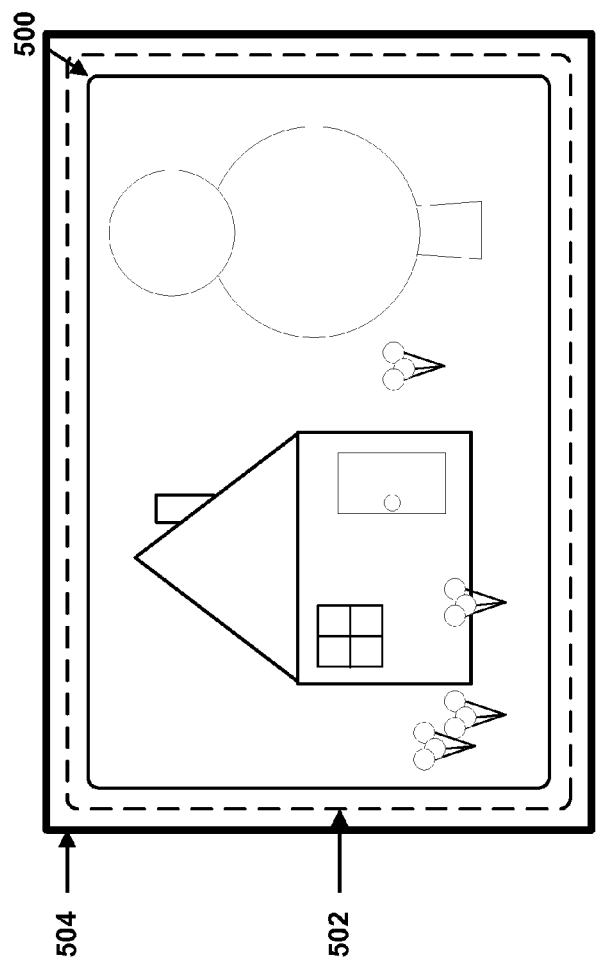
Figure 5C:
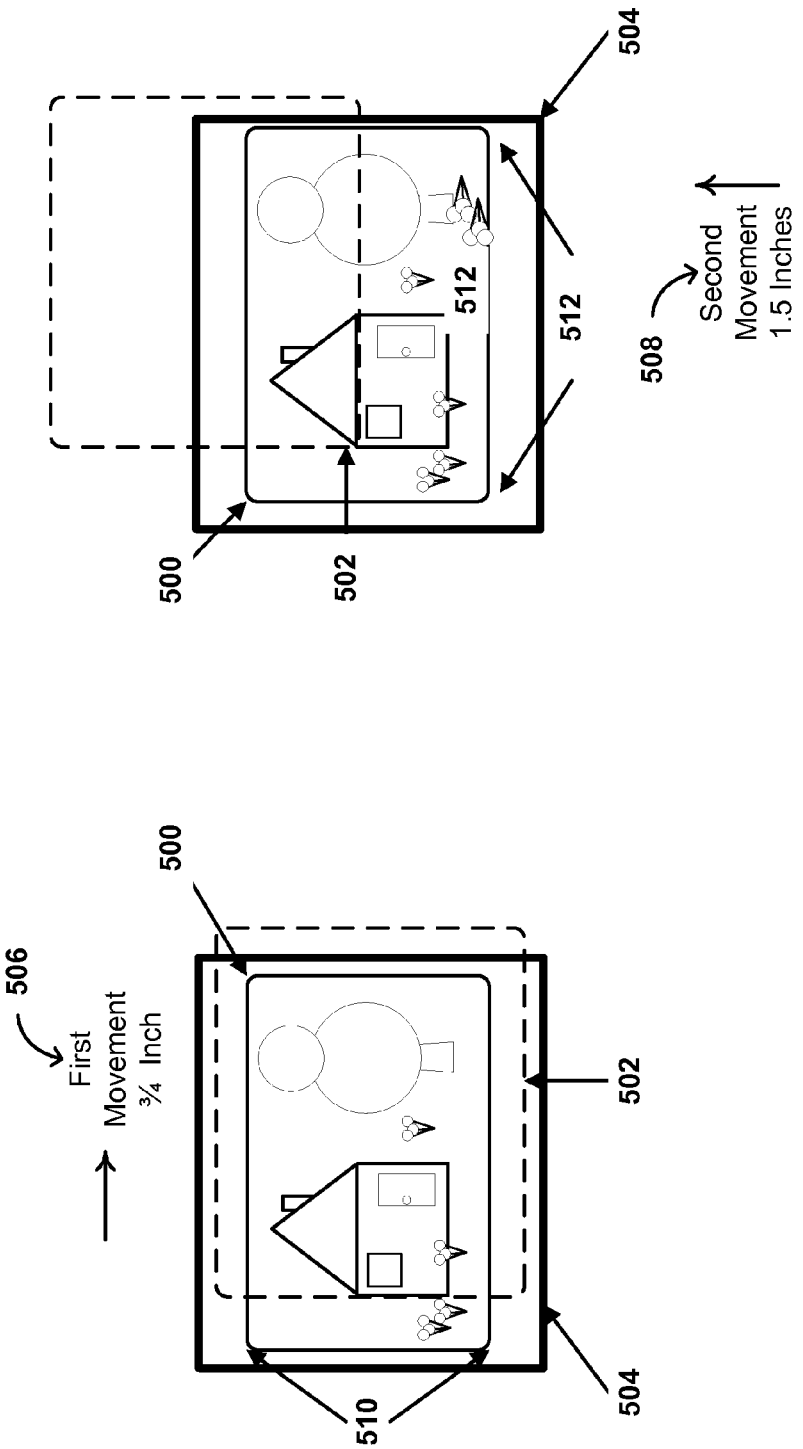

Once the crop window has been sized, at step 426, the computing device may provide the crop window over a region of the image data based on the direction and the magnitude to crop the image data. In the instances in which the movement information includes a rotation, the computing device may further provide the crop window over a region of the image data based on a rotation that defines the movement of the computing device. To do so, the computing device may process or parse the data representing the movement (described at step 402), and cause the crop window to be positioned accordingly. In other words, the computing device will process the series of movements received by the computing device and position the crop window based on those movements. For example, consider FIG. 5C. In FIG. 5C, for simplicity, only two movements are received: a first movement 506 and a second movement 508, which represent the series of movements of the computing device. In other examples, many more movements may be received and represent a larger series of movement. Based on this series of movement, the crop window 502 may be positioned; the crop window 502 may first be moved ¾ of an inch right and subsequently moved 1.5 inches up. Alternatively, in other examples, the image data may be positioned for cropping instead of the crop window (e.g., the crop window remains stationary and the image data may be moved). Once the crop window has been positioned, the image data may be cropped ensuring any portions outside the crop window are not visible thereby creating a cropped image. Accordingly, the cropped image may represent a reduced portion of the image data and may have different dimensions than the original image data.

In some instances, providing the crop window may be based on a crop rate that is applied to the measurement or quantification of the movement. For example, a crop rate of ½ may be used along with the movement information to position the crop window. For instance, if the computing device received movement information including a magnitude of 5 inches, the computing device may apply the crop rate of ½, and interpret the magnitude to be 2.5 inches instead of 5 inches (i.e., ½×5=2.5 inches). Using the derived 2.5 inches the computing device may position the crop window. Using a crop rate in this manner may help prevent the computing device from cropping based on unintentional over-movements or exaggerated movements, and help prevent cropping based on inaccurate movements that may result from sensor delay, for example. Accordingly, the user may be provided with more control as he/she moves the computing device to ensure an accurate cropping action is performed.

Other methods exist that may facilitate more accurate positioning of the crop window over the region of the image data during cropping. These methods help ensure the cropping corresponds to intended movements of the computing device. In one example technique, to position the crop window, the computing device may utilize a center threshold. For example, based at least in part on the at least one magnitude, the computing device may determine whether the movement passes a center-threshold of the computing device, and when it does, position the crop window over the region of the image data within the viewing frame based on the direction and the magnitude. The center-threshold may be a pre-defined midpoint or center point of the viewing frame, for example.

Stated differently, the computing device may be configured such that the computing device crops the image data based on movements that pass a center-threshold. For example, after cropping the image data based on a first movement (e.g., a tilt of the computing device), the computing device may be configured such that upon receiving a second movement—in an opposite direction, for example—the computing device maintains the image in the cropped configuration (i.e., the portion of the image that exited the frame is not visible), but the subsequent movement is not used as a basis to perform subsequent cropping until the movement passes a center threshold. By iteratively panning, tilting, or nodding, the user can crop the image as desired.

In another example method, to position the crop window over the region of the image data, the computing device may position the image data at a center position after each movement. Accordingly, the computing device may position the crop window over the region of the image data within the viewing frame based on the direction and magnitude, determine a change in movement, and based at least in part on the change in the movement, position the image data at a center-position within the viewing frame. Using this technique, after cropping the image data, the computing device may be configured such that upon receiving a movement in a different direction, the computing device may prepare the user for the next cropping movement by centering the image data.

In some examples, using methods and systems described herein, digital image data may be cropped based on movement of the computing device in a manner such that the crop window movement matches (or substantially matches) movement of the computing device. Thus, the computing device may be moved along any axis and along any direction, in which the crop window may be positioned along the same axis and direction over image data. In such examples, image data may include three-dimensional (3D) image data, and the crop window may take the form of a 3D crop window (or a 3D cropping shape) that can be configured to be positioned over the 3D image data to crop out portions of the 3D image data that fall outside the 3D crop window. In an example in which the computing device is a mobile phone or a tablet computer, the phone or computer may determine movement of the phone or computer and crop image data accordingly.

Figure 4C:
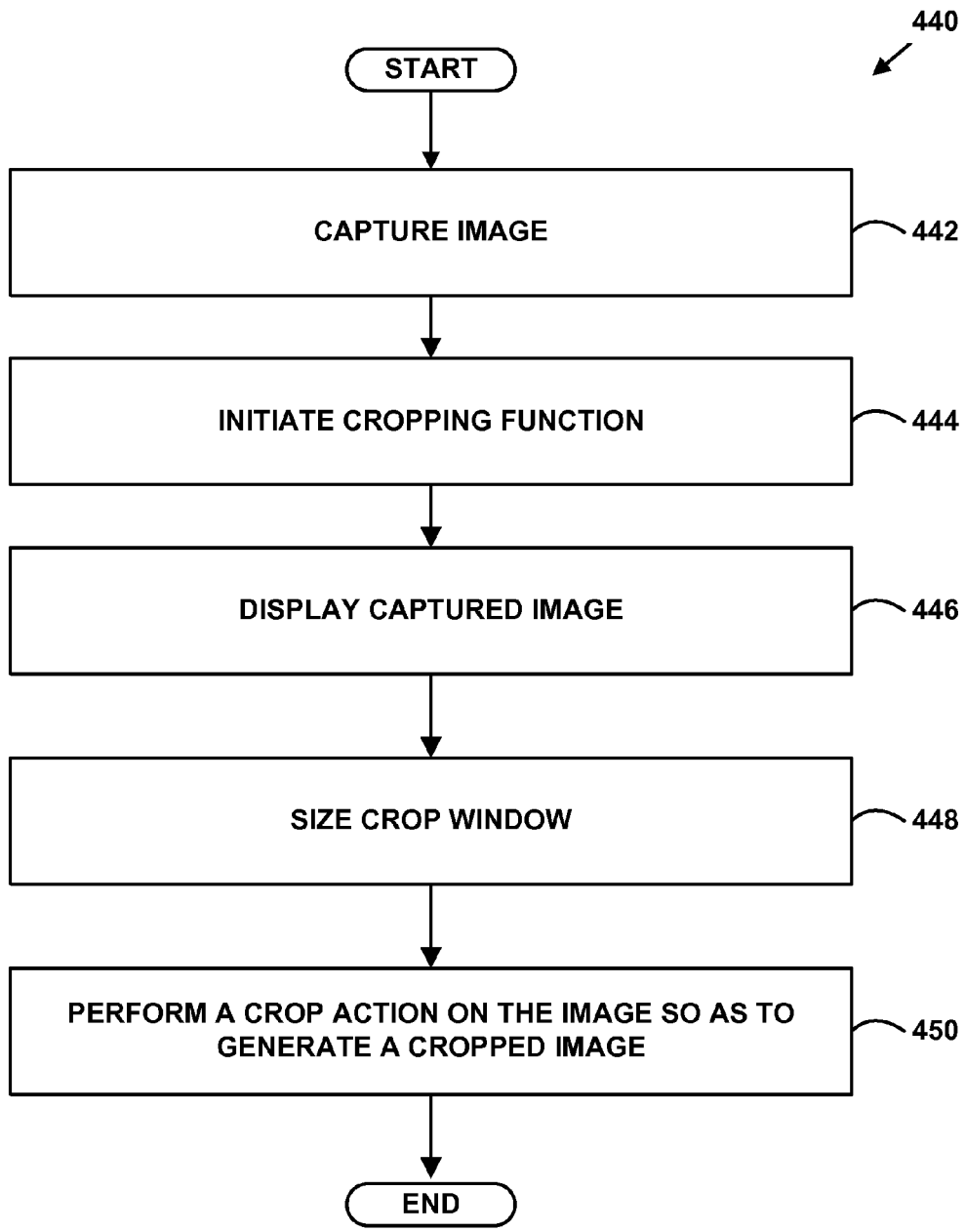
FIG. 4C is a block diagram of an example method for cropping a digital image based on movement data using an HMD, in accordance with embodiments described herein.

FIG. 4C is another block diagram of an example method 440 for cropping a digital image based on movement data using an HMD. In other words, this process may be used to crop a digital image by a user wearing an HMD such as head-mounted device 202. Initially, at block 442, method 440 includes capture an image. The user may capture image data using video camera 220. The image data may take the form of a digital image and may represent a scene of a house, as depicted in FIG. 5A, for example. FIG. 5A illustrates image data in the form of a digital image 500 that may be displayed in a viewing frame 504 on the head-mounted device. The viewing frame may be frame elements 204, 206, as shown in FIG. 2A, for example.

After capturing the digital image 500, at step 444, the user of the HMD may initiate cropping functionality or a cropping mode. The cropping mode may be initiated, for example, by receiving an input from a touch-pad or other touch sensor of the HMD, or receiving a voice command, for example. In one instance, the cropping mode may be initiated when the user wearing the HMD performs a certain head movement. For example, the user may tilt and hold his/her head up for 3 seconds thereby initiating the cropping mode. Other movements are possible as well.

Once the cropping mode has been initiated, at step 446, the HMD may display the captured image of 500 on the HMD. For example, the digital image 500 may be displayed in a viewing frame an on a display of the HMD. The viewing frame may be frame elements 204, 206, as shown in FIG. 2A, and the display may be lens elements 210, 212, for example. FIG. 5A illustrates an example of captured digital image 500 being displayed to the user. In FIG. 5A digital image 500 is displayed within viewing frame 504. Initiating the cropping functionality may also generate a crop window 502 that is visible within the viewing frame 504, and crop window 502 may be initially generated as a standard size (e.g., 2.5 inches by 2.5 inches) shown as 502A in FIG. 5B for example.

Once the standard crop window has been generated, at step 448, method 420 includes size the crop window. Accordingly crop window 502 may be sized by the user. To do so, the user may begin to tilt or pan his/her head in various directions providing new dimensions for the crop window. The movements may be any of the movements discussed with regard to method 400 and may be obtained in any of the manners discussed with regard to method 400.

For example, the user wearing the HMD may perform a series of hands-free movements that, when taken together, provide the dimensions of the crop window. For example, the user may perform a series of head motions 503A, 503B including panning his/her head up, panning his/her head down, panning his/her head to the left and panning his/her head to the right. The crop window may be sized accordingly, and may be sized in a manner such that the crop window size matches (or substantially matches) the degree of movement of the head of the user. In FIG. 5B, the generated crop window 502B is a result of the user performing head motions 503A and the final crop window 502 is the result of the user performing head motions 503B (following the performance of head motions 503A). Accordingly, the crop window may be resized based on the series of movements performed by the user thereby creating a crop window sized as desired by the user. In this particular example, the crop window 502 may be generated to fit around the digital image 500.

Once the user has initiated the cropping functionality of the HMD, the captured digital image has been displayed on the HMD, and the user has sized the crop window, at step 450 the HMD may perform a cropping action on the digital image to crop the digital image. The user may begin to tilt or pan his/her head in various directions to begin the cropping the digital image. While the user pans or tilts his/her head, the movement information may be obtained by a sensor of the HMD, such as an accelerometer. In one instance, the user may pan his/her head right with a magnitude of ¾ of an inch, and subsequently pan his/her head up with a magnitude of 1.5 inches. Such movements are shown in FIG. 5C as 506 and 508, respectively.

Figure 5D:
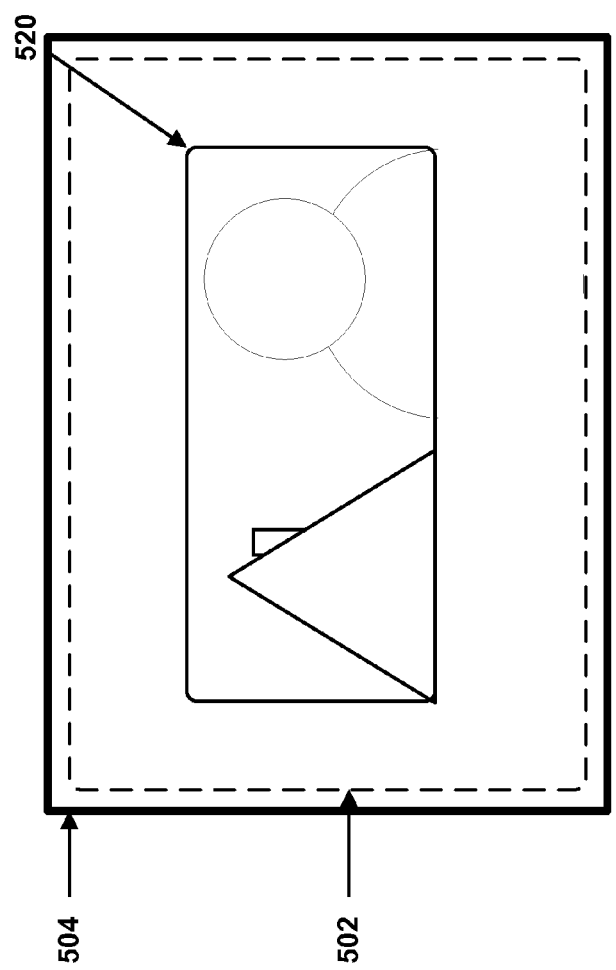

FIG. 5D depicts the positioning of crop window 502 based on the two movements 506, 508 of the HMD. In FIG. 5D the crop window has been positioned based on the movement information received by the HMD, which are demarcated "First Movement," and "Second Movement." Cropping the digital image produces the cropped digital image 520, as illustrated in FIG. 5D. The cropped digital image in 5D depicts the digital image 500 with a left portion 510 and a bottom portion 512 (shown in FIG. 5C) no longer being visible. In this example, the cropping action was performed fluidly based on two distinct movements. However, in other examples, techniques incorporating the aforementioned center threshold or center position may be used, and the cropping action may be performed based on more desired movements.

Moreover, in this example, once the cropping operation was completed the cropped digital image 520 has been centered in the display of the HMD, and the crop window 502 has been centered around the cropped digital image 520. However, other manners are possible to position the cropped digital image. In one example, the cropped digital image 520 may remain in the display as positioned during cropping. In another example, the crop window 502 may not be visible around cropped digital image 520.

Utilizing an HMD in a manner as outlined in FIG. 4B allows the user to perform a natural, hands free technique to crop a digital image.

In some embodiments, the disclosed methods may be implemented as computer program instructions encoded on a non-transitory computer-readable storage media in a machine-readable format, or on other non-transitory media or articles of manufacture. FIG. 6 is a schematic illustrating a conceptual partial view of an example computer program product that includes a computer program for executing a computer process on a computing device, arranged according to at least some embodiments presented herein.

In one embodiment, the example computer program product 600 is provided using a signal bearing medium 601. The signal bearing medium 601 may include one or more programming instructions 602 that, when executed by one or more processors may provide functionality or portions of the functionality described above with respect to FIGS. 1-5. In some examples, the signal bearing medium 601 may encompass a computer-readable medium 603, such as, but not limited to, a hard disk drive, a Compact Disc (CD), a Digital Video Disk (DVD), a digital tape, memory, etc. In some implementations, the signal bearing medium 601 may encompass a computer recordable medium 604, such as, but not limited to, memory, read/write (R/W) CDs, R/W DVDs, etc. In some implementations, the signal bearing medium 601 may encompass a communications medium 605, such as, but not limited to, a digital and/or an analog communication medium (e.g., a fiber optic cable, a waveguide, a wired communications link, a wireless communication link, etc.). Thus, for example, the signal bearing medium 601 may be conveyed by a wireless form of the communications medium 605 (e.g., a wireless communications medium conforming with the IEEE 802.11 standard or other transmission protocol).

The one or more programming instructions 602 may be, for example, computer executable and/or logic implemented instructions. In some examples, a computing device such as the computing device 100 of FIG. 1 may be configured to provide various operations, functions, or actions in response to the programming instructions 602 conveyed to the computing device 600 by one or more of the computer readable medium 603, the computer recordable medium 604, and/or the communications medium 605.

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

I claim:

1. A method comprising:
   receiving, at a wearable computing device, an image, wherein the wearable computing device comprises a head-mountable display (HMD), wherein the HMD comprises a viewing frame configured to display the image;
   receiving first user-input corresponding to initiation of a crop mode on the wearable computing device and responsively displaying, in the viewing frame, a crop window overlaid on the image; and
   subsequent to receiving the first user-input corresponding to the crop mode, and while the image is displayed in the HMD:
   (a) receiving movement information that is indicative of at least one movement of the HMD, wherein the at least one movement of the HMD, comprises at least one of a pan of the HMD, or a tilt of the HMD; and
   (b) in response to receiving the movement information:
   (i) adjusting, based on the movement information, at least one of a size and a position of the crop window relative to the image, wherein the adjustment to the crop window is initiated as the movement information is being received, and (ii) while adjusting the crop window, performing a cropping action on the image, wherein the cropping action comprises removing, in real-time, any portions of the image that move outside of the crop window during the adjustment of the crop window, and wherein the display of the image in the viewing frame is updated in accordance with the cropping action, as the cropping action is being performed.

2. The method of claim 1, wherein:
   the pan of the wearable computing device corresponds to one or more of a head movement left, a head movement right, a head movement up, a head movement down, a leaning movement left, a leaning movement right, a leaning movement forward, or a leaning movement back; and the tilt of the wearable computing device corresponds to one or more of a head-tilt movement forward, a head-tilt movement back, a head-tilt movement left, or a head-tilt movement right.

3. The method of claim 1, wherein the movement information is received by an accelerometer that is communicatively coupled to the HMD.

4. The method of claim 1, wherein receiving the movement information that is indicative of the at least one movement comprises receiving information indicative of at least one direction and at least one magnitude that defines the at least one movement of the HMD.

5. The method of claim 4, wherein adjusting, based on the movement information, at least one of a size and a position of the crop window relative to the image comprises:
  sizing the crop window based on at least one of the at least one direction or the at least one magnitude; and
  providing the crop window over a region of the image within the viewing frame based on the at least one direction and the at least one magnitude.

6. The method of claim 5, wherein providing the crop window over the region of the image within the viewing frame based on at least one of the at least one direction or the at least one magnitude further comprises positioning the crop window over a region of the image within the viewing frame based on a crop rate.

7. The method of claim 5, wherein:
  receiving the movement information that is indicative of the at least one movement of the wearable computing device further comprises receiving information indicative of at least one rotation that further defines the at least one movement; and
  providing the crop window over the region of the image within the viewing frame further comprises positioning the crop window based on the at least one rotation.

8. The method of claim 5, wherein providing the crop window over the region of the image within the viewing frame based on at least one of the at least one direction or the at least one magnitude comprises:
  based at least in part on the at least one magnitude, determining that the at least one movement passes a center-threshold of the wearable computing device; and
  positioning the crop window over the region of the image data within the viewing frame based on the at least one direction and the at least one magnitude.

9. The method of claim 5, wherein providing the crop window over the region of the image within the viewing frame based on at least one of the at least one direction or the at least one magnitude comprises:
  positioning the crop window over the region of the image within the viewing frame based on the at least one direction and the at least one magnitude;
  determining a change in the at least one movement; and
  based at least in part on the change in the at least one movement, positioning the image data at a center-position within the viewing frame.

10. The method of claim 1, wherein the first user-input comprises one or more of: (i) a speech command received via a microphone of the wearable computing device and (ii) touch input receive via a touchpad of the wearable computing device.

11. The method of claim 1, wherein the first user-input corresponds to detecting that the wearable computing device maintains a particular orientation for at least a threshold time period.

12. The method of claim 1,
  wherein the size of the cropping window substantially matches a size of the viewing frame,
  wherein adjusting at least one of a size and a position of the crop window relative to the image comprises adjusting the position of the crop window relative to the image, and
  wherein removing the portions of the image that move outside of the crop window corresponds to removing the portions of the image that move outside of the viewing frame as the crop window is being adjusted.

13. A wearable computing device comprising:
  a head mountable display (HMD), wherein the HMD comprises a viewing frame;
  a non-transitory computer-readable medium;
  at least one processor; and
  program instructions stored on the non-transitory computer-readable medium and executable by the at least one processor to perform functions comprising:
    receiving an image, wherein the image is displayed within the viewing frame;
    receiving first user-input corresponding to initiation of a crop mode on the wearable computing device and responsively displaying, in the viewing frame, a crop window overlaid on the image; and
    subsequent to receiving the first user-input corresponding to the crop mode, and while the image is displayed in the HMD:
      (a) receiving movement information that is indicative of at least one movement of the HMD, wherein the at least one movement of the HMD comprises at least one of a pan of the HMD wearable computing device or a tilt of the HMD; and
      (b) in response to receiving the movement information: (i) adjusting, based on the movement information, at least one of a size and a position of the crop window relative to the image, wherein the adjustment to the crop window is initiated as the movement information is being received, and (ii) while adjusting the crop window, performing a cropping action on the image, wherein the cropping action comprises removing, in real-time, any portions of the image that move outside of the crop window during the adjustment of the crop window, and wherein the display of the image in the viewing frame is updated in accordance with the cropping action, as the cropping action is being performed.

14. The wearable computing device of claim 13, wherein:
  the pan of the wearable computing device corresponds to one or more of a head movement left, a head movement right, a head movement up, a head movement down, a leaning movement left, a leaning movement right, a leaning movement forward, or a leaning movement back; and
  the tilt of the wearable computing device corresponds to one or more of a head-tilt movement forward, a head-tilt movement back, a head-tilt movement left, or a head-tilt movement right.

15. The wearable computing device of claim 13, wherein the movement information is received by an accelerometer that is communicatively coupled to the HMD.

16. The wearable computing device of claim 13, wherein receiving the movement information that is indicative of the at least one movement comprises receiving information indicative of at least one direction and at least one magnitude that defines the at least one movement of the HMD.

17. The wearable computing device of claim 16, wherein adjusting, based on the movement information, at least one of a size and a position of the crop window relative to the image comprises:
- sizing the crop window based on at least one of the at least one direction or the at least one magnitude; and
- providing the crop window over a region of the image within the viewing frame based on the at least one direction and the at least one magnitude.

18. The wearable computing device of claim 17, wherein:
- receiving the movement information that is indicative of the at least one movement of the HMD further comprises receiving information indicative of at least one rotation that further defines the at least one movement; and
- providing the crop window over the region of the image within the viewing frame further comprises positioning the crop window based on the at least one rotation.

19. The wearable computing device of claim 17, wherein providing the crop window over the region of the image within the viewing frame based on the at least one direction and the at least one magnitude comprises:
- based at least in part on the at least one magnitude, determining the at least one movement passes a center-threshold of the HMD; and
- positioning the crop window over the region of the image within the viewing frame based on the at least one direction and the at least one magnitude.

20. The wearable computing device of claim 17, wherein providing the crop window over the region of the image within the viewing frame based on the at least one direction and the at least one magnitude comprises:
- positioning the crop window over the region of the image within the viewing frame based on the at least one direction and the at least one magnitude;
- determining a change in the at least one movement; and
- based at least in part on the change in the at least one movement, positioning the image at a center-position within the viewing frame.

21. A non-transitory computer-readable medium having stored therein program instructions executable by a wearable computing device to cause the wearable computing device to perform functions comprising:
- receiving an image;
- displaying the image on a head mountable display (HMD) within a viewing frame;
- receiving first user-input corresponding to initiation of a crop mode on the wearable computing device and responsively displaying, in the viewing frame, a crop window overlaid on the image; and
- subsequent to receiving the first user-input corresponding to the crop mode, and while the image is displayed in the HMD:
  - (a) receiving movement information that is indicative of at least one movement of the HMD, wherein the at least one movement of the HMD, comprises at least one of a pan of the HMD, or a tilt of the HMD; and
  - (b) in response to receiving the movement information:
    - (i) adjusting, based on the movement information, at least one of a size and a position of the crop window relative to the image, wherein the adjustment to the crop window is initiated as the movement information is being received, and (ii) while adjusting the crop window, performing a cropping action on the image, wherein the cropping action comprises removing, in real-time, any portions of the image that move outside of the crop window during the adjustment of the crop window, and wherein the display of the image in the viewing frame is updated in accordance with the cropping action, as the cropping action is being performed.

22. The non-transitory computer-readable medium of claim 21, wherein:
- the pan of the HMD corresponds to one or more of a head movement left, a head movement right, a head movement up, a head movement down, a leaning movement left, a leaning movement right, a leaning movement forward, or a leaning movement back; and
- the tilt of the HMD corresponds to one or more of a head-tilt movement forward, a head-tilt movement back, a head-tilt movement left, or a head-tilt movement right.

23. The non-transitory computer-readable medium of claim 21, wherein the movement information is received by an accelerometer that is communicatively coupled to the HMD.

24. The non-transitory computer-readable medium of claim 21, wherein the program instructions are further executable by the wearable computing device to cause the wearable computing device to perform functions comprising receiving information indicative of at least one direction and at least one magnitude that defines the at least one movement of the HMD.

25. The non-transitory computer-readable medium of claim 24, wherein adjusting, based on the movement information, at least one of a size and a position of the crop window relative to the image comprises:
- sizing the crop window based on at least one of the at least one direction or the at least one magnitude; and
- providing the crop window over a region of the image within the viewing frame based on the at least one direction and the at least one magnitude.

26. The non-transitory computer-readable medium of claim 25, wherein:
- receiving the movement information that is indicative of the at least one movement of the HMD further comprises receiving information indicative of at least one rotation that further defines the at least one movement; and
- providing the crop window over the region of the image within the viewing frame further comprises positioning the crop window based on the at least one rotation.

27. The non-transitory computer-readable medium of claim 25, wherein providing the crop window over a region of the image within the viewing frame based on the at least one direction and the at least one magnitude comprises:
- based at least in part on the at least one magnitude, determining the at least one movement passes a center-threshold of the computing device; and
- positioning the crop window over the region of the image within the viewing frame based on the at least one direction and the at least one magnitude.

28. The non-transitory computer-readable medium of claim 25, wherein providing the crop window over a region of the image within the viewing frame based on the at least one direction and the at least one magnitude comprises:
- positioning the crop window over the region of the image within the viewing frame based on the at least one direction and the at least one magnitude;
- determining a change in the at least one movement; and
- based at least in part on the change in the at least one movement, positioning the image at a center-position within the viewing frame.

* * * * *